US011804589B2

United States Patent
Otaki et al.

(10) Patent No.: US 11,804,589 B2
(45) Date of Patent: Oct. 31, 2023

(54) ALL SOLID STATE BATTERY

(71) Applicant: TOYOTA JIDOSHA KABUSHIKI KAISHA, Toyota (JP)

(72) Inventors: Mitsutoshi Otaki, Susono (JP); Jun Yoshida, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 154 days.

(21) Appl. No.: 17/533,303

(22) Filed: Nov. 23, 2021

(65) Prior Publication Data

US 2022/0190315 A1    Jun. 16, 2022

(30) Foreign Application Priority Data

Dec. 11, 2020    (JP) ................................. 2020-205596

(51) Int. Cl.
| | | |
|---|---|---|
| *H01M 4/134* | (2010.01) | |
| *H01M 10/0562* | (2010.01) | |
| *H01M 10/0585* | (2010.01) | |
| *H01M 4/02* | (2006.01) | |

(52) U.S. Cl.
CPC ....... *H01M 4/134* (2013.01); *H01M 10/0562* (2013.01); *H01M 10/0585* (2013.01); *H01M 2004/021* (2013.01); *H01M 2004/027* (2013.01); *H01M 2300/0068* (2013.01)

(58) Field of Classification Search
CPC ............. H01M 4/134; H01M 10/0562; H01M 2004/021; H01M 2004/027; H01M 2300/0068
See application file for complete search history.

(56) References Cited

U.S. PATENT DOCUMENTS

2012/0295160 A1*  11/2012  Miller ................... H01M 4/387
                                                          252/182.1
2015/0380724 A1   12/2015  Chan

FOREIGN PATENT DOCUMENTS

| JP | H09-194206 A | 7/1997 |
| JP | 2017-112029 A | 6/2017 |
| JP | 2018-106984 A | 7/2018 |

* cited by examiner

*Primary Examiner* — Carlos Barcena
*Assistant Examiner* — Joshua P McClure
(74) *Attorney, Agent, or Firm* — Oliff PLC

(57) ABSTRACT

A main object of the present disclosure is to provide an all solid state battery with excellent capacity durability when restraining pressure is not applied or even when low restraining pressure is applied thereto. The present disclosure achieves the object by providing an all solid state battery comprising layers in the order of a cathode layer, a solid electrolyte layer, and an anode layer; wherein the anode layer contains an anode active material including a silicon clathrate II type crystal phase; restraining pressure of 0 MPa or more and less than 5 MPa is applied to the all solid state battery in a layering direction; and a specific surface area of the anode active material is 8 m²/g or more and 17 m²/g or less.

5 Claims, 1 Drawing Sheet

Silicon clathrate II type

Diamond type silicon

Silicon clathrate II type

ALL SOLID STATE BATTERY

TECHNICAL FIELD

The present disclosure relates to an all solid state battery.

BACKGROUND ART

An all solid state battery is a battery including a solid electrolyte layer between a cathode layer and an anode layer, and one of the advantages thereof is that the simplification of a safety device may be more easily achieved compared to a liquid-based battery including a liquid electrolyte containing a flammable organic solvent. Also, as an active material used for an all solid state battery, a Si-based active material has been known. For example, Patent Literature 1 discloses an all solid state battery using a Si-containing active material as an anode active material. Patent Literature 2 discloses a clathrate of which inclusion lattice comprises silicon and a carbon atom.

CITATION LIST

Patent Literatures

Patent Literature 1: Japanese Patent Application Laid-Open (JP-A) No. 2017-112029
Patent Literature 2: JP-A No. H09-194206

SUMMARY OF DISCLOSURE

Technical Problem

The theoretical capacity of Si is large and it is advantageous to allow a battery to have high energy density. On the other hand, the volume change of Si during charge and discharge is large, and thus the volume change of an electrode layer and a battery using Si is large during charge and discharge. When the volume change during charge and discharge is large, ion conducting path and electron conducting path are easily cut off, and the capacity durability of the all solid state battery is easily degraded. In order to secure the ion conducting path and the electron conducting path, high restraining pressure is presumably applied to the battery, but a restraining jig is required to apply the restraining pressure, and the restraining jig in large size is required to apply high restraining pressure.

The present disclosure has been made in view of the above circumstances, and a main object of the present disclosure is to provide an all solid state battery with excellent capacity durability when restraining pressure is not applied or even when low restraining pressure is applied thereto.

Solution to Problem

The present disclosure provides an all solid state battery comprising layers in the order of a cathode layer, a solid electrolyte layer, and an anode layer; wherein the anode layer contains an anode active material including a silicon clathrate II type crystal phase; restraining pressure of 0 MPa or more and less than 5 MPa is applied to the all solid state battery in a layering direction; and a specific surface area of the anode active material is 8 m$^2$/g or more and 17 m$^2$/g or less.

According to the present disclosure, by using the anode active material including the silicon clathrate II type crystal phase and setting the specific surface area thereof to the specified range, an all solid state battery is allowed to have excellent capacity durability when restraining pressure is not applied or even when low restraining pressure is applied thereto.

In the disclosure, the restraining pressure may be 2.5 MPa or less.

In the disclosure, the specific surface area may be 9.1 m$^2$/g or more and 15.1 m$^2$/g or less.

In the disclosure, the all solid state battery may not include a restraining jig that applies the restraining pressure.

In the disclosure, when an X-ray diffraction measurement using a CuKα ray is conducted to the anode active material, peaks may be observed at positions of $2\theta=20.09°\pm0.50°$ and $31.72°\pm0.50°$.

Advantageous Effects of Disclosure

The present disclosure exhibits an effect of providing an all solid state battery with excellent capacity durability when restraining pressure is not applied or even when low restraining pressure is applied thereto.

DESCRIPTION OF EMBODIMENTS

The all solid state battery in the present disclosure is hereinafter explained in details.

The all solid state battery in the present disclosure comprises layers in the order of a cathode layer, a solid electrolyte layer, and an anode layer; wherein the anode layer contains an anode active material including a silicon clathrate II type crystal phase; restraining pressure of 0 MPa or more and less than 5 MPa is applied to the all solid state battery in a layering direction; and a specific surface area of the anode active material is 8 m$^2$/g or more and 17 m$^2$/g or less.

According to the present disclosure, by using the anode active material including the silicon clathrate II type crystal phase and setting the specific surface area thereof to the specified range, an all solid state battery is allowed to have excellent capacity durability when restraining pressure is not applied or even when low restraining pressure is applied thereto.

Figure 1A:
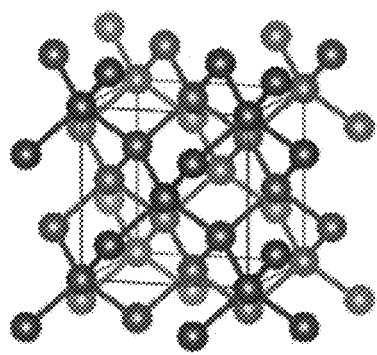
FIGS. 1A and 1B are schematic perspective views explaining the crystal phase of Si.

As described above, Si has been known as an anode active material with large theoretical capacity. Typical Si includes a diamond type crystal phase. As shown in FIG. 1A, in the Si crystal phase of diamond type, a plurality of Si atoms form a tetrahedron. The tetrahedron does not have a space inside to include metal ions such as Li ions, and thus its volume change due to charge and discharge easily occurs.

Figure 1B:
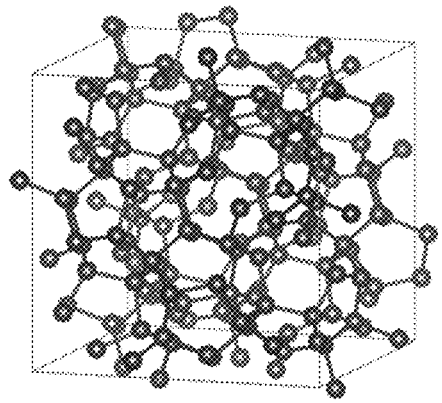

On the other hand, in the present disclosure, an anode active material including a silicon clathrate II type crystal phase is used. As shown in FIG. 1B, in the silicon clathrate II type crystal phase, a plurality of Si atoms form a polyhedron (cage) including pentagons and hexagons. This polyhedron has a space inside to include metal ions such as Li ions. The metal ions are intercalated to this space to inhibit the volume change due to charge and discharge.

Further, in the present disclosure, the anode active material including the silicon clathrate II type crystal phase is used while setting the specific surface area thereof to the specified range, and thus excellent capacity durability may be obtained when restraining pressure is not applied or even when low restraining pressure is applied thereto. As described above, by using the anode active material including the silicon clathrate II type crystal phase, the volume change due to charge and discharge may be inhibited. On the other hand, excellent capacity durability may not be obtained by simply using such an anode active material. In particular, it is difficult to obtain excellent capacity durability when restraining pressure is not applied or when low restraining pressure is applied.

Then, inventors of the present application have focused on the dispersion state of anode active materials in an anode layer. For example, if the dispersion state of anode active materials in an anode layer is not well, the battery reaction would be uneven (reaction nonuniformity would occur), and there is a possibility that the volume change inhibiting function provided with the anode active material may not be sufficiently exhibited. The inventors of the present application have focused on the specific surface area of the anode active material in order to have the excellent dispersion state of anode active materials in the anode layer, and specified the range of the specific surface area. As a result, it has been confirmed that the excellent capacity durability was obtained when restraining pressure is not applied or even when low restraining pressure is applied.

In particular, in later described Examples, the capacity durability equivalent to the case where restraining pressure of 5 MPa was applied was obtained for the case where restraining pressure was not applied. The restraining pressure 5 MPa corresponds to relatively low pressure as restraining pressure for a general all solid state battery, but it is equivalent to load of 500 t/m$^2$. Achievement of the equivalent capacity durability to the case where such a restraining pressure was applied and to the case where restraining pressure was not applied, is a remarkable result. Further, the all solid state battery in the present disclosure does not need the arrangement of a large restraining jig, and one of the advantages thereof is that simplification of the structure of the all solid state battery is achievable.

1. Restraining Pressure and Specific Surface Area

To the all solid state battery in the present disclosure, restraining pressure of 0 MPa or more and less than 5 MPa is applied in a layering direction. The restraining pressure may be applied using the later described restraining jig. Here, "the restraining pressure of 0 MPa" means that the restraining pressure is not applied. Examples of the case where the restraining pressure is 0 MPa may include a case where the all solid state battery does not include the restraining jig, a case where the all solid state battery includes the restraining jig but the restraining pressure is not applied thereto, and a case where the inside of the laminated cells are vacuumed so as to restrain by atmospheric pressure.

The restraining pressure may be 0 MPa, and may be larger than 0 MPa. In the latter case, the restraining pressure is, for example, 0.1 MPa or more and may be 0.5 MPa or more. Meanwhile, the restraining pressure is usually less than 5 MPa, may be 4.5 MPa or less, may be 3 MPa or less, may be 2.5 MPa or less, and may be 1.0 MPa or less.

Also, the specific surface area of the anode active material is usually 8 m$^2$/g or more and may be 9.1 m$^2$/g or more. Meanwhile, the specific surface area of the anode active material is usually 17 m$^2$/g or less and may be 15.1 m$^2$/g or less. There is a possibility that excellent capacity durability may not be obtained both of when the specific surface area is too small and too large. The specific surface area may be obtained by, for example, using a specific surface area and pore size distribution measurement device, and a mercury porosimeter.

Also, in the present disclosure, the capacity ratio of the anode capacity with respect to the cathode capacity is regarded as A. The capacity ratio A is, for example, 2.5 or more and may be 3.0 or more. If the capacity ratio A is too small, there is a possibility that excellent capacity durability may not be obtained. Meanwhile, the capacity ratio A is, for example, 4.8 or less and may be 4.1 or less. If the capacity ratio A is too large, there is a possibility that excellent volume energy density may not be obtained. The anode capacity may be obtained by multiplying the theoretical capacity of the anode active material and the amount of the anode active material. Meanwhile, the cathode capacity may be obtained by multiplying the charge capacity of the cathode active material and the amount of the cathode active material. Regarding the charge capacity of the cathode active material, a single electrode powder compression cell using a metal Li as a counter electrode is produced, and CCCV-charged at 0.1 C (1/100 C cut or 20 hours cut), then the initial charge capacity obtained thereby is regarded as the charge capacity of the cathode active material. The capacity ratio A may be adjusted by changing the ratio of the cathode active material and the anode active material. In specific, it may be adjusted by changing the thickness of at least one of the cathode layer and the anode layer.

2. Constitution of all Solid State Battery

Figure 2:
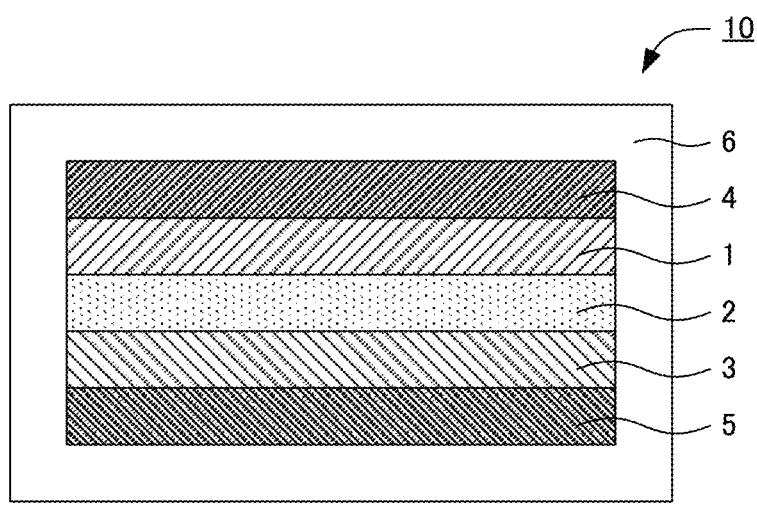
FIG. 2 is a schematic cross-sectional view illustrating an example of the all solid state battery in the present disclosure.

FIG. 2 is a schematic cross-sectional view illustrating an example of the all solid state battery in the present disclosure. All solid state battery 10 illustrated in FIG. 2 has layers in the order of cathode layer 1, solid electrolyte layer 2, and anode layer 3. Also, the all solid state battery 10 includes cathode current collector 4 for collecting currents of the cathode layer 1, anode current collector 5 for collecting currents of the anode layer 3, and battery case 6 for storing these members.

(1) Anode Layer

The anode layer in the present disclosure contains an anode active material including a silicon clathrate II type crystal phase. Also, the anode layer may further contain at least one of a conductive material, a binder, and a solid electrolyte, as required.

The anode active material includes the silicon clathrate II type crystal phase. The silicon clathrate II type crystal phase usually belongs to the space group Fd-3m. In an XRD measurement using a Cu-Kα ray, the silicon clathrate II type crystal phase has typical peaks at the positions of 2θ=20.09°, 21.00°, 26.51°, 31.72°, 36.26°, and 53.01°. Each of these peaks may shift in the range of ±0.50°, may shift in the range of ±0.30°, and may shift in the range of ±0.10°.

Also, the anode active material preferably has the silicon clathrate II type crystal phase as a main phase. "Having the silicon clathrate II type crystal phase as a main phase" means that the peak belonging to the silicon clathrate II type crystal phase has the largest diffraction intensity among the peaks observed in an X-ray diffraction measurement.

In the silicon clathrate II type crystal phase, a peak positioned at 2θ=20.09°±0.50° is regarded as peak A, and a peak positioned at 2θ=31.72°±0.50° is regarded as peak B. Also, the intensity of the peak A is regarded as $I_A$, and the intensity of the peak B is regarded as $I_B$. Meanwhile, the maximum intensity in 2θ=22° to 23° is regarded as $I_M$. Since 2θ=22° to 23° is the range where peaks of crystal phase relating to Si does not usually appear, it can be used as the basis.

The value of $I_A/I_M$ is preferably larger than 1. When the value of $I_A/I_M$ is 1 or less, it can be judged that the silicon clathrate II type crystal phase is substantially not formed. The value of $I_A/I_M$ is, for example, 2 or more, may be 5 or more, and may be 7 or more. Meanwhile, there are no particular limitations on the upper limit of the value of $I_A/I_M$ (for example, the value of $I_A/I_M$ may be 1000 or more in some cases).

The value of $I_B/I_M$ is preferably larger than 1. When the value of $I_B/I_M$ is 1 or less, it can be judged that the silicon clathrate II type crystal phase is substantially not formed. The value of $I_B/I_M$ is, for example, 2 or more and may be 5 or more. Meanwhile, there are no particular limitations on the upper limit of the value of $I_B/I_M$ (for example, the value of $I_B/I_M$ may be 1000 or more in some cases).

Also, the anode active material may or may not include a silicon clathrate I type crystal phase. "Not including a crystal phase" can be confirmed when peaks of that crystal phase are not confirmed by an X-ray diffraction measurement. The silicon clathrate I type crystal phase usually belongs to a space group Pm-3n. The silicon clathrate I type crystal phase has typical peaks at the positions of 2θ=19.44°, 21.32°, 30.33°, 31.60°, 32.82°, 36.29°, 52.39°, and 55.49° in an XRD measurement using a Cu-Kα ray. Each of these peaks may shift in the range of ±0.50°, may shift in the range of ±0.30°, and may shift in the range of ±0.10°.

In addition, the anode active material may or may not include a diamond type Si crystal phase, but the latter is preferable. In an X-ray diffraction measurement using a Cu-Kα ray, the diamond type Si crystal phase has typical peaks at the positions of 2θ=28.44°, 47.31°, 56.10°, 69.17°, and 76.37°. Each of these peaks may shift in the range of ±0.50°, may shift in the range of ±0.30°, and may shift in the range of ±0.10°.

Examples of the shape of the anode active material may include a granular shape. The active material may be a primary particle, and may be a secondary particle which is aggregation of the primary particles. The average particle size of the primary particle is, for example, 50 nm or more, may be 100 nm or more, and may be 150 nm or more. Meanwhile, the average particle size of the primary particle is, for example, 3000 nm or less, may be 1500 nm or less, and may be 1000 nm or less. Also, the average particle size of the secondary particle is, for example, 1 μm or more, may be 2 μm or more, and may be 5 μm or more. Meanwhile, the average particle size of the secondary particle is, for example, 60 μm or less and may be 40 μm or less. Incidentally, the average particle size can be obtained by, for example, observation with SEM. The number of samples is preferably large; for example, it is 20 or more, may be 50 or more, and may be 100 or more.

The anode active material may include a void inside the primary particle. As described above, the silicon clathrate II type crystal phase has a cage to include metal ions such as Li ions so as to inhibit the volume change due to charge and discharge. When the primary particle including that crystal phase has a void inside, that void also contribute to inhibit the volume change, and thus the volume change due to charge and discharge may be further inhibited. As a result, the restraining pressure of the all solid state battery can be further lowered. It is preferable that the anode active material includes a lot of minute voids of which pore radius is 100 nm or less. The reason therefor is to inhibit the void from being crushed by pressing. The void amount of the voids of which pore radius is 100 nm or less is, for example, 0.05 cc/g or more, may be 0.07 cc/g or more, and may be 0.10 cc/g or more. Meanwhile, the void amount is, for example, 0.15 cc/g or less. The void amount may be obtained by, for example, a mercury porosimeter measurement, a BET measurement, a gas absorption method, 3D-SEM, and 3D-TEM. Incidentally, the anode active material may not include a void inside the primary particle.

When the anode active material include a void inside the primary particle, that void rate is, for example, 4% or more, and may be 10% or more. Also, the void rate is, for example, 40% or less and may be 20% or less.

The composition of the anode active material is not particularly limited, but is preferably represented by $Na_xSi_{136}$ (0≤x≤24). The "x" may be 0 and may be larger than 0. Meanwhile, the "x" may be, for example, 10 or less, and may be 5 or less. Incidentally, the anode active material may contain inevitable component such as Li. The composition of the active material may be obtained by, for example, EDX, XRD, XRF, ICP, and an atomic absorption method.

There are no particular limitations on the method for producing the anode active material in the present disclosure, and examples thereof may include a method comprising a synthesizing step of synthesizing a zintl compound including Zintl phase and containing Na and Si, and a removing step of removing the Na from the zintl compound.

In the synthesizing step, for example, the zintl compound may be obtained by conducting a heat treatment to a raw material mixture containing Na (simple substance) and Si (simple substance). Regarding the proportion of Na (simple substance) and Si (simple substance), Na (simple substance) with respect to 1 molar part of Si (simple substance) is, for example, 0.8 molar part or more and 1.5 molar part or less. The heat treatment temperature is, for example, 500° C. or more and 1000° C. or less. The heat treatment time is, for example, 1 hour or more and 50 hours or less.

In the removing step, for example, Na is removed from the zintl compound by a heat treatment. The heat treatment temperature is, for example, 280° C. or more and 500° C. or less. The heat treatment time is, for example, 1 hour or more and 50 hours or less. The heat treatment may be conducted in a normal pressure atmosphere, and may be conducted in a reduced pressure atmosphere.

The anode active material including a void inside the primary particle may be obtained by, for example, bringing a precursor active material including the silicon clathrate II type crystal phase into reacting with Li to form an alloy compound, and then removing Li from the alloy compound. Examples of Li extracting agents for removing Li may include alcohol such as ethanol and acid such as acetic acid.

Also, the proportion of the anode active material in the anode layer is, for example, 20 weight % or more, may be 30 weight % or more, may be 40 weight % or more, and may be 60 weight % or more. If the proportion of the anode active material is too little, there is a possibility that sufficient energy density may not be obtained. Meanwhile, the proportion of the anode active material is, for example, 80 weight % or less, and may be 70 weight % or less. If the proportion of the anode active material is too much, there is a possibility that the ion conductivity and the electron conductivity in the anode layer may be relatively degraded.

Also, when the anode layer contains a solid electrolyte, the weight ratio of the anode active material and the solid electrolyte (anode active material:solid electrolyte) is, for example, 85:15 to 30:70, and may be 80:20 to 40:60.

Examples of the solid electrolyte may include solid electrolytes in the later described "(3) Solid electrolyte layer". Examples of the conductive material may include a carbon material, a metal particle, and a conductive polymer. Examples of the carbon material may include a particulate carbon material such as acetylene black (AB) and Ketjen black (KB), and a fiber carbon material such as carbon fiber, carbon nanotube (CNT), and carbon nanofiber (CNF). Further, examples of the binder may include a rubber-based binder and a fluoride-based binder.

The thickness of the anode layer is, for example, 0.1 µm or more and 1000 µm or less, may be 1 µm or more and 100 µm or less, and may be 30 µm or more and 100 µm or less.

(2) Cathode Layer

The cathode layer in the present disclosure is a layer containing at least a cathode active material. Also, the cathode layer may contain at least one of a solid electrolyte, a conductive material, and a binder, as required.

Examples of the cathode active material may include an oxide active material. Examples of the oxide active material may include a rock salt bed type active material such as $LiCoO_2$, $LiMnO_2$, $LiNiO_2$, $LiVO_2$, and $LiNi_{1/3}Co_{1/3}Mn_{1/3}O_2$; a spinel type active material such as $LiMn_2O_4$, $Li_4Ti_5O_{12}$ and $Li(Ni_{0.5}Mn_{i.5})O_4$; and an olivine type active material such as $LiFePO_4$, $LiMnPO_4$, $LiNiPO_4$, and $LiCoPO_4$.

A coating layer containing Li-ion conductive oxide may be formed on the surface of the oxide active material. The reason therefor is to inhibit the reaction of the oxide active material and the solid electrolyte (particularly a sulfide solid electrolyte). Examples of the Li-ion conductive oxide may include $LiNbO_3$, $Li_4Ti_5O_{12}$, and $Li_3PO_4$. The thickness of the coating layer is, for example, 1 nm or more and 30 nm or less. Also, as the cathode active material, for example, $Li_2S$ can be used.

The kinds of the solid electrolyte, the conductive material and the binder to be used in the cathode layer are in the same contents as those described in "(1) Anode layer" above; thus, the descriptions herein are omitted. Incidentally, when the cathode layer contains a solid electrolyte, the weight ratio of the cathode active material and the solid electrolyte (cathode active material:solid electrolyte) is, for example, 85:15 to 30:70, and may be 80:20 to 50:50.

The thickness of the cathode layer is, for example, 0.1 µm or more and 1000 µm or less, may be 1 µm or more and 100 µm or less, and may be 30 µm or more and 100 µm or less.

(3) Solid Electrolyte Layer

The solid electrolyte layer in the present disclosure is a layer formed between the cathode layer and the anode layer, and contains at least a solid electrolyte. Also, the solid electrolyte layer may further contain a binder as required. The kinds of the binder are in the same contents as those described in "(1) Anode layer" above; thus, the descriptions herein are omitted.

Examples of the solid electrolyte may include an inorganic solid electrolyte such as a sulfide solid electrolyte, an oxide solid electrolyte, a nitride solid electrolyte, and a halide solid electrolyte. Examples of the sulfide solid electrolyte may include a solid electrolyte containing a Li element, an X element (X is at least one kind of P, As, Sb, Si, Ge, Sn, B, Al, Ga, and In), and a S element. Also, the sulfide solid electrolyte may further contain at least one of an O element and a halogen element. Examples of the halogen element may include a F element, a Cl element, a Br element, and an I element. The sulfide solid electrolyte may be glass (amorphous), and may be a glass ceramic. Examples of the sulfide solid electrolyte may include $Li_2S$—$P_2S_5$, $LiI$—$Li_2S$—$P_2S_5$, $LiI$—$LiBr$—$Li_2S$—$P_2S_5$, $Li_2S$—$SiS_2$, $Li_2S$—$GeS_2$, and $Li_2S$—$P_2S_5$—$GeS_2$.

The thickness of the solid electrolyte layer is, for example, 0.1 µm or more and 1000 µm or less, may be 0.1 µm or more and 300 µm or less, and may be 0.1 µm or more and 100 µm or less.

(4) Restraining Jig

The all solid state battery in the present disclosure may or may not further include a restraining jig that applies a restraining pressure along with the thickness direction of the all solid state battery. In particular, the all solid state battery in the present disclosure preferably does not include a restraining jig. When the restraining jig is not included, the constitution of the all solid state battery may be further simplified, and the energy density as the battery overall may further improve.

When the all solid state battery does not include the restraining jig, the restraining pressure is usually 0 MPa. Meanwhile, when the all solid state battery includes the restraining jig, the restraining pressure is usually larger than 0 MPa. Incidentally, the restraining pressure may be 0 MPa even when the restraining jig is included. The details of the restraining pressure are in the same contents as those described in "1. Restraining pressure and specific surface area" above; thus, the descriptions herein are omitted.

There are no particular limitations on the kind of the restraining jig, and examples thereof may include a restraining jig that applies restraining torque by a bolt.

(5) Other Constitutions

The all solid state battery in the present disclosure preferably comprises a cathode current collector for collecting currents of the cathode layer, an anode current collector for collecting currents of the anode layer, and a battery case for storing the above described members. Examples of the material for the cathode current collector may include SUS, Ni, Cr, Au, Pt, Al, Fe, Ti, and Zn. Also, a coating layer such as Ni, Cr and C may be formed on the surface of the cathode current collector. The coating layer may be, for example, a plated layer, and may be a vapor deposition layer. Meanwhile, examples of the material for the anode current collector may include Cu and a Cu alloy. A coating layer such as Ni, Cr and C may be formed on the surface of the anode current collector. The coating layer may be, for example, a plated layer, and may be a vapor deposition layer. As the battery case, conventionally known cases may be used.

(6) All Solid State Battery

The kind of the all solid state battery in the present disclosure is not particularly limited, but is typically a lithium ion battery. Also, the all solid state battery in the present disclosure may be a primary battery and may be a secondary battery, but preferably a secondary battery among them. The reason therefor is to be repeatedly charged and discharged and useful as a car-mounted battery for example.

The all solid state battery in the present disclosure may be a single battery and may be a layered battery. The layered battery may be a monopolar layered battery (layered battery connected in parallel), and may be a bipolar layered battery (layered battery connected in series). Examples of the shape of the all solid state battery may include a coin shape, a laminate shape, a cylindrical shape and a square shape.

Incidentally, the present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

Example 1

<Production of Anode Active Material>

Si particles and Na particles were mixed so as to be 1:1 in molar ratio, the mixture was heated at 700° C. to synthesize a NaSi (zintl compound). After that, the zintl compound was heated at 340° C. to remove Na. The obtained particles were crushed by ball milling in the conditions of 150 rpm and 1 hour to produce an anode active material.

<Production of Anode>

A dispersion medium (butyl butyrate), a binder (5 wt % butyl butyrate solution; PVDF-based binder), the produced anode active material, a sulfide solid electrolyte ($Li_2S$—$P_2S_5$-based glass ceramic), and a conductive material (VGCF) were added to a container made of polypropylene (PP), and agitated for 30 seconds by an ultrasonic dispersion apparatus (UH-50 from SMT Corporation). Next, the container was shaken for 30 minutes by a shaker (TTM-1 from SIBATA SCIENTIFIC TECHNOLOGY LTD.) to prepare an anode composition. The anode composition was pasted on an anode current collector (Cu foil from UACJ) by a blade method using an applicator to form a coating layer. The coating layer was dried for 30 minutes on a hot plate at 100° C. Thereby, an anode including an anode current collector and an anode layer were produced.

<Production of Cathode>

A dispersion medium (butyl butyrate), a binder (5 wt % butyl butyrate solution; PVDF-based binder), a cathode active material ($LiNi_{1/3}Co_{1/3}Mn_{1/3}O_2$; average particle size 6 μm), a sulfide solid electrolyte ($Li_2S$—$P_2S_5$-based glass ceramic), and a conductive material (VGCF) were added to a container made of polypropylene (PP), and agitated for 30 seconds by an ultrasonic dispersion apparatus (UH-50 from SMT Corporation). Next, the container was shaken for 3 minutes by a shaker (TTM-1 from SIBATA SCIENTIFIC TECHNOLOGY LTD.) and further agitated by the ultrasonic dispersion apparatus for 30 seconds, and then further shaken for 3 minutes by a shaker (TTM-1 from SIBATA SCIENTIFIC TECHNOLOGY LTD.) to prepare a cathode composition. The cathode composition was pasted on a cathode current collector (Al foil from SHOWA DENKO K.K) by a blade method using an applicator to form a coating layer. After that, the coating layer was dried for 30 minutes on a hot plate at 100° C. Thereby, a cathode was produced. Incidentally, the area of the cathode was made smaller than the area of the anode.

<Production of Solid Electrolyte Layer>

A dispersion medium (heptane), a binder (5 wt % heptane solution; BR-based binder), and a sulfide solid electrolyte ($Li_2S$—$P_2S_5$-based glass ceramic) were added to a container made of PP, and agitated for 30 seconds by an ultrasonic dispersion apparatus (UH-50 from SMT Corporation). Next, the container was shaken for 30 minutes by a shaker (TTM-1 from SIBATA SCIENTIFIC TECHNOLOGY LTD.) to prepare a solid electrolyte composition. The solid electrolyte composition was pasted on a peeling sheet (Al foil) by a blade method using an applicator to form a coating layer. The coating layer was dried for 30 minutes on a hot plate at 100° C. Thereby, a transfer member including the peeling sheet and the solid electrolyte layer was obtained.

<Production of all Solid State Battery>

A solid electrolyte layer for bonding was arranged on the cathode layer in the cathode, and installed to a roll-pressing machine, then pressed at 20 kN/cm (approximately 710 MPa) and 165° C. Thereby, a first layered body was obtained.

Next, the anode was installed to a roll-pressing machine and pressed at 20 kN/cm (approximately 630 MPa) and 25° C. After that, from the anode layer side, arranged were in the order of the solid electrolyte layer for bonding and the transfer member. On this occasion, the solid electrolyte layer for bonding and the solid electrolyte layer in the transfer member were arranged so as to face to each other. The obtained layered body was installed to a plane uniaxial pressing machine and provisionally pressed at 100 MPa and 25° C. for 10 seconds. After that, the peeling sheet was peeled off from the solid electrolyte layer. Thereby, a second layered body was obtained.

Next, the solid electrolyte layer for bonding in the first layered body and the solid electrolyte layer in the second layered body were arranged so as to face each other, installed to a plane uniaxial pressing machine, and pressed at 200 MPa and 135° C. for 1 minute. Thereby, an all solid state battery was obtained. Incidentally, the produced all solid state battery was not restrained by a restraining jig.

Example 2

An anode active material was produced in the same manner as in Example 1 except that the conditions of the ball milling were changed to 150 rpm and 2 hours. An all solid state battery was produced in the same manner as in Example 1 except that the obtained anode active material was used.

Example 3

An anode active material was produced in the same manner as in Example 1 except that the conditions of the ball milling were changed to 200 rpm and 3 hours. An all solid state battery was produced in the same manner as in Example 1 except that the obtained anode active material was used.

Comparative Example 1

The anode active material obtained in Example 3 and Li were mixed using mortar to obtain a LiSi alloy. The obtained LiSi alloy was brought into reaction with ethanol to obtain an anode active material including a void inside the primary particle. An all solid state battery was produced in the same manner as in Example 1 except that the obtained anode active material was used.

Comparative Examples 2 to 5

An all solid state battery was respectively produced in the same manner as in Examples 1 to 3 and Comparative Example 1, except that the battery was respectively restrained at the restraining pressure of 5 MPa using a restraining jig.

Comparative Example 6

An anode active material was produced in the same manner as in Example 1 except that the conditions of the ball milling were changed to 100 rpm and 1 hour. An all solid state battery was produced in the same manner as in Example 1 except that the obtained anode active material was used.

Reference Example 1

An all solid state battery was produced in the same manner as in Example 1, except that a conventional Si particle (diamond type Si) was used as the anode active material.

Reference Example 2

An all solid state battery was produced in the same manner as in Reference Example 1, except that the battery was restrained at the restraining pressure of 5 MPa using a restraining jig.

Reference Examples 3 and 4

An all solid state battery was produced in the same manner as in Reference Example 2, except that a Si particle (diamond type Si) with the specific surface area shown in Table 1 was respectively used.

[Evaluation]

<XRD measurement>

An X-ray diffraction (XRD) measurement using CuKα ray was respectively conducted to the anode active materials obtained in Examples 1 to 3 and Comparative Examples 1 and 6. As a result, the peaks peculiar to the silicon clathrate II type were obtained, and it was confirmed that the anode active materials obtained in Examples 1 to 3 and Comparative Examples 1 and 6 had the silicon clathrate II type crystal phase as a main phase. Also, $I_A/I_M$ and $I_B/I_M$ were respectively obtained from the XRD data, and the all were larger than 1.

<Specific Surface Area Measurement>

The specific surface area of the anode active materials obtained in Examples 1 to 3, Comparative Examples 1, 6, and Reference Examples 1, 3 and 4 was respectively measured by a specific surface area and pore distribution measurement device (from Shimadzu Corporation). On the occasion of the measurement, a pre-treatment was conducted in the conditions of 120° C. and 12 hours under a vacuum. Also, the specific surface area was respectively obtained by a multipoint method. The results (average values of sample numbers of 3) are shown in Table 1.

<Charge and Discharge Test>

Constant Current—Constant Voltage (CCCV) charge was conducted to each of the all solid state battery produced in Examples 1 to 3, Comparative Examples 1 to 6, and Reference Examples 1 to 4, until 4.55 V at 10 hour rate (1/10 C), and each of the battery was discharged until 3.0 V at 1 hour rate (1 C). After that, the CCCV charge was conducted until 4.35 V at 3 hour rate (1/3 C), CCCV discharge was conducted until 3.00 V at 3 hour rate (1/3 C), and the initial discharge capacity was respectively obtained. This cycle was repeated for 5 times, and the discharge capacity after the 5 cycles was respectively obtained. The capacity durability was respectively calculated by dividing the discharge capacity after the 5 cycles by the initial discharge capacity. The results are shown in Table 1.

TABLE 1

|  | Main crystal structure of anode active material | Restraining Pressure (MPa) | Specific surface area ($m^2g^{-1}$) | Capacity durability (%) |
|---|---|---|---|---|
| Example 1 | Clathrate II type | 0 | 9.1 | 87.3 |
| Example 2 | Clathrate II type | 0 | 13.1 | 92.2 |
| Example 3 | Clathrate II type | 0 | 15.1 | 89.4 |
| Comparative Example 1 | Clathrate II type | 0 | 27.1 | 16.1 |
| Comparative Example 2 | Clathrate II type | 5 | 9.1 | 95.7 |
| Comparative Example 3 | Clathrate II type | 5 | 13.1 | 95.6 |
| Comparative Example 4 | Clathrate II type | 5 | 15.1 | 95.2 |
| Comparative Example 5 | Clathrate II type | 5 | 27.1 | 96.4 |
| Comparative Example 6 | Clathrate II type | 0 | 4.0 | 62.5 |
| Reference Example 1 | Diamond type | 0 | 3.2 | 82 |
| Reference Example 2 | Diamond type | 5 | 3.2 | 100.2 |
| Reference Example 3 | Diamond type | 5 | 18 | 100.7 |
| Reference Example 4 | Diamond type | 5 | 50 | 99.7 |

As shown in Table 1, the capacity durability of the Reference Example 2 using the conventional Si (diamond type Si) was high since the restraining pressure of 5 Mpa was applied, but the capacity durability of Reference Example 1 was drastically degraded since the restraining pressure was not applied. Also, the capacity durability of Reference Examples 3 and 4 was high even though the specific surface area was significantly different from that of Reference Example 1, since the restraining pressure of 5 MPa was applied.

On the other hand, the capacity durability of Examples 1 to 3 using Si with the clathrate II type crystal phase and applied no restraining pressure, was respectively slightly lower than that of Comparative Examples 2 to 4 to which the restraining pressure of 5 MPa was applied; however, excellent capacity durability of 87% or more was respectively obtained. Also, in comparison of Reference Examples 1 and 2, the capacity durability was decreased in approximately 18% when the restraining pressure was not applied. In contrast, in comparison of Example 1 and Comparative Example 2, the decrease in the capacity durability was only in 8% when the restraining pressure was not applied. Also, as in Comparative Examples 1 and 6, excellent capacity durability was not obtained when the specific surface area of Si was too large or too small, even when the Si with the clathrate II type crystal phase was used. In particular, the capacity durability of Examples 1 to 3 was about 5 times or higher than that of Comparative Example 1.

In this manner, an all solid state battery with excellent capacity durability was obtained when the anode active material including the silicon clathrate II type crystal phase was used and the specific surface area was set to the specified range, even when the restraining pressure was not applied or when low restraining pressure was applied thereto.

REFERENCE SIGNS LIST

1 cathode layer
2 solid electrolyte layer
3 anode layer
4 cathode current collector
5 anode current collector
6 battery case
10 all solid state battery

What is claimed is:

1. An all solid state battery comprising layers in the order of a cathode layer, a solid electrolyte layer, and an anode layer; wherein
 the anode layer contains an anode active material including a silicon clathrate II type crystal phase;
 restraining pressure of 0 MPa or more and less than 5 MPa is applied to the all solid state battery in a layering direction; and
 a specific surface area of the anode active material is 8 $m^2/g$ or more and 17 $m^2/g$ or less.

2. The all solid state battery according to claim 1, wherein the restraining pressure is 2.5 MPa or less.

3. The all solid state battery according to claim 1, wherein the specific surface area is 9.1 $m^2/g$ or more and 15.1 $m^2/g$ or less.

4. The all solid state battery according to claim 1, wherein the all solid state battery does not include a restraining jig that applies the restraining pressure.

5. The all solid state battery according to claim 1, wherein, when an X-ray diffraction measurement using a CuKα ray is conducted to the anode active material, peaks are observed at positions of $2\theta=20.09°\pm0.50°$ and $31.72°\pm0.50°$.

* * * * *